United States Patent [19]

Hart et al.

[11] Patent Number: 5,033,848

[45] Date of Patent: Jul. 23, 1991

[54] PENDULOUS COMPENSATOR FOR LIGHT BEAM PROJECTOR

[75] Inventors: Edward E. Hart, Springfield; Peter S. Winckler, Dayton; Douglas B. Monnin, Huber Heights, all of Ohio

[73] Assignee: Spectra-Physics, Inc., San Jose, Calif.

[21] Appl. No.: 380,131

[22] Filed: Jul. 14, 1989

[51] Int. Cl.⁵ .................. G01C 1/10; G01C 5/00; G01C 9/12; G02B 27/64

[52] U.S. Cl. .................. 356/149; 33/291; 33/391; 350/500; 356/250

[58] Field of Search .......... 356/138, 149, 250; 33/DIG. 21, 286, 290, 291, 391, 402; 350/500

[56] References Cited

U.S. PATENT DOCUMENTS

| | | | |
|---|---|---|---|
| 2,779,231 | 1/1957 | Drodofsky | 356/250 |
| 4,679,937 | 7/1987 | Cain et al. | |
| 4,801,791 | 1/1989 | Cain . | |
| 4,852,265 | 8/1989 | Rando et al. | 33/DIG. 21 |

FOREIGN PATENT DOCUMENTS 1393969  5/1975  United Kingdom ........... 356/500

OTHER PUBLICATIONS

Dictionary of Mechanical Engineering, third edition, Nayler, pp. 98-99, 128, 209, 264 and 277.

Primary Examiner—F. L. Evans
Assistant Examiner—K. P. Hantis
Attorney, Agent, or Firm—Killworth, Gottman, Hagan & Schaeff

[57] ABSTRACT

A pendulous compensator for use in a light beam projector including a light beam source comprises first and second upper pulleys spaced from one another and secured to the light beam projector. First and second lower pulleys are positioned beneath the first and second upper pulleys and supported by filament strands, tapes, loops or the like extending around the upper and lower pulleys. A pendulum mirror is secured to and supported between the first and second lower pulleys for receiving a light beam from the light beam source and reflecting the light beam in a desired angular orientation relative to horizontal. The first and second lower pulleys in the pendulum mirror are supported such that the pendulum mirror is moved to compensate for tilting of the light beam projector. The first and second upper pulleys or a folding mirror may be controlled to select a grade angle relative to horizontal of a projected light beam. A portion of the light beam may also be directed to the rear side of the pendulum mirror to also provide for the projection of a substantially vertically oriented light beam from the projector.

32 Claims, 8 Drawing Sheets

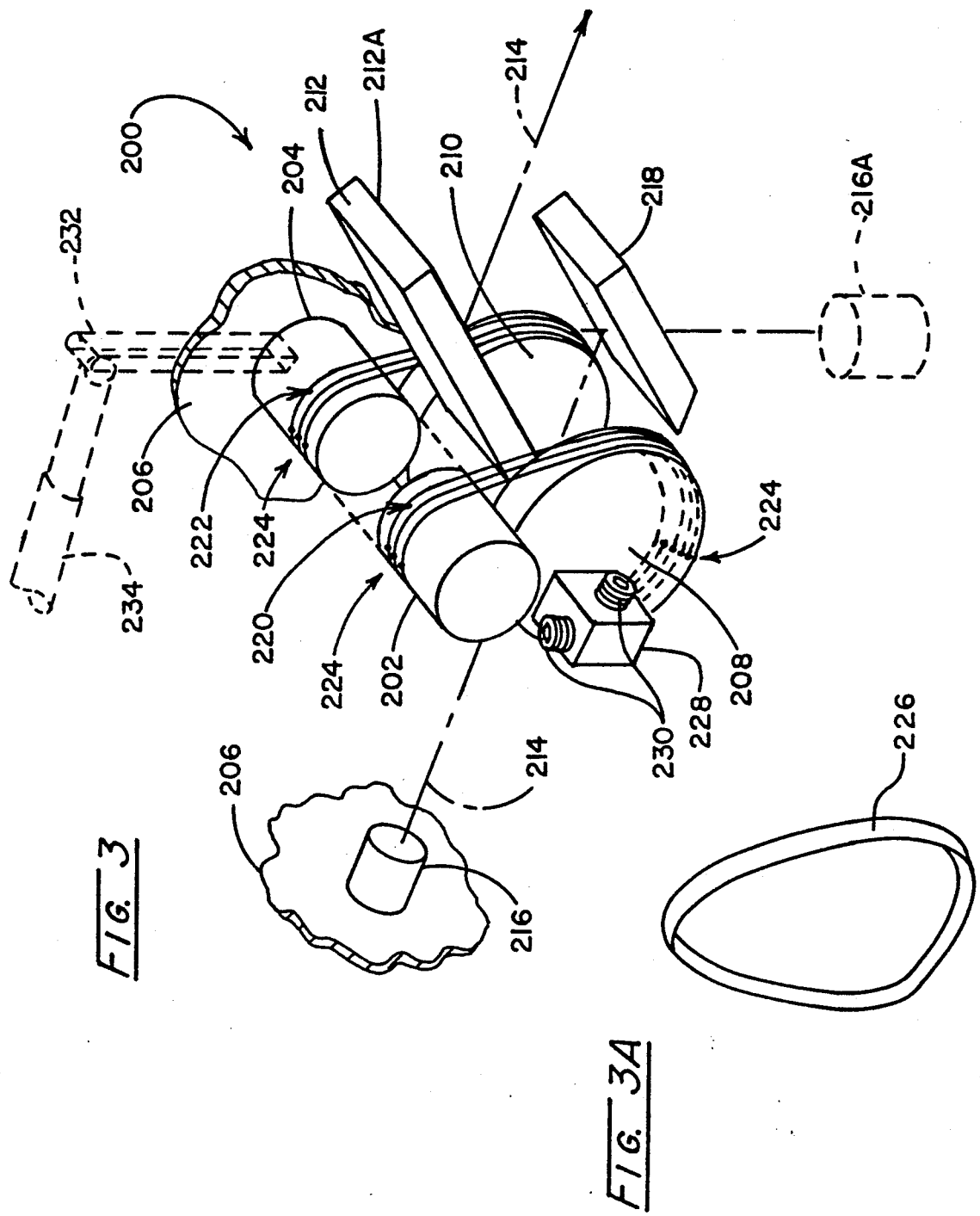

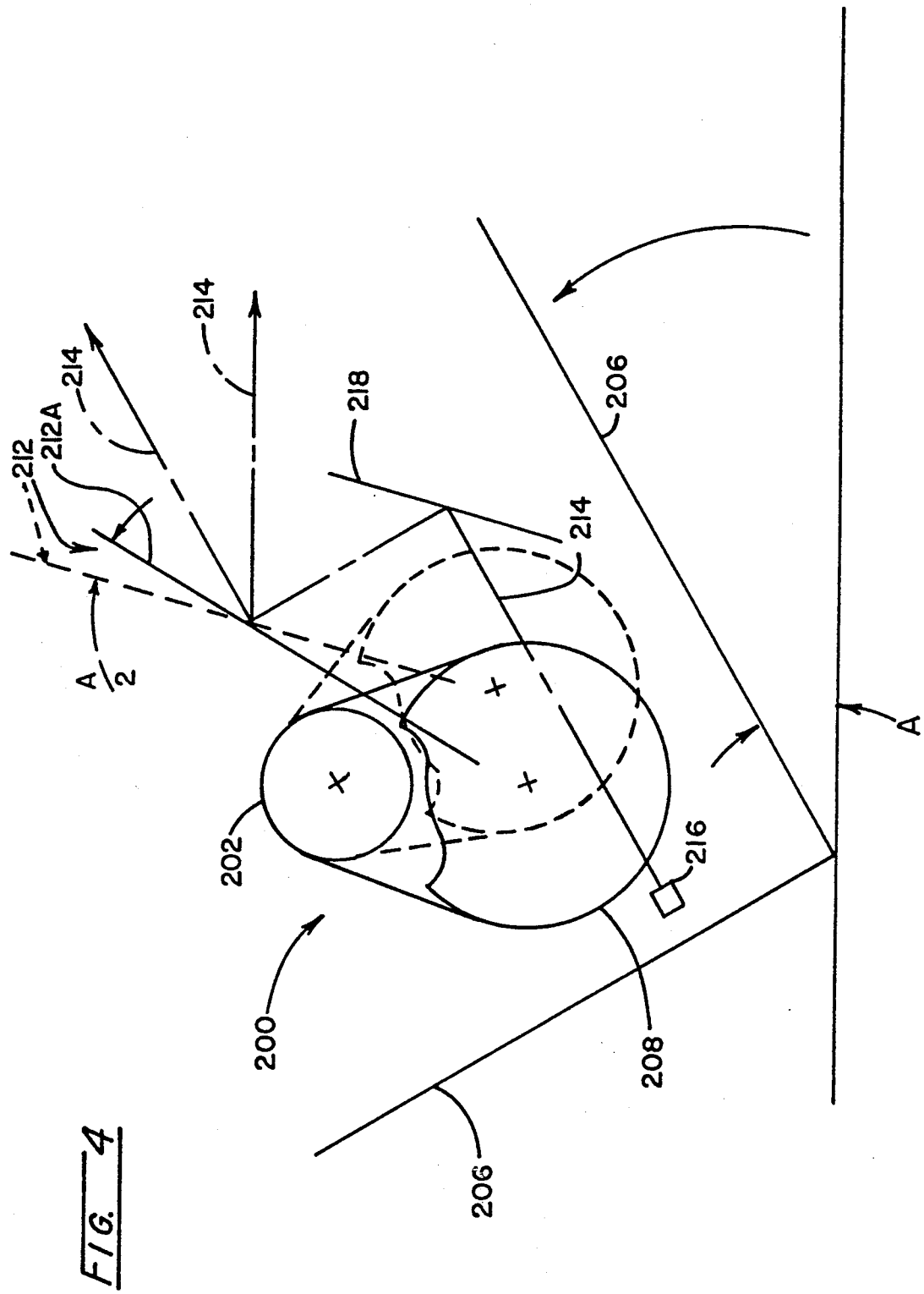

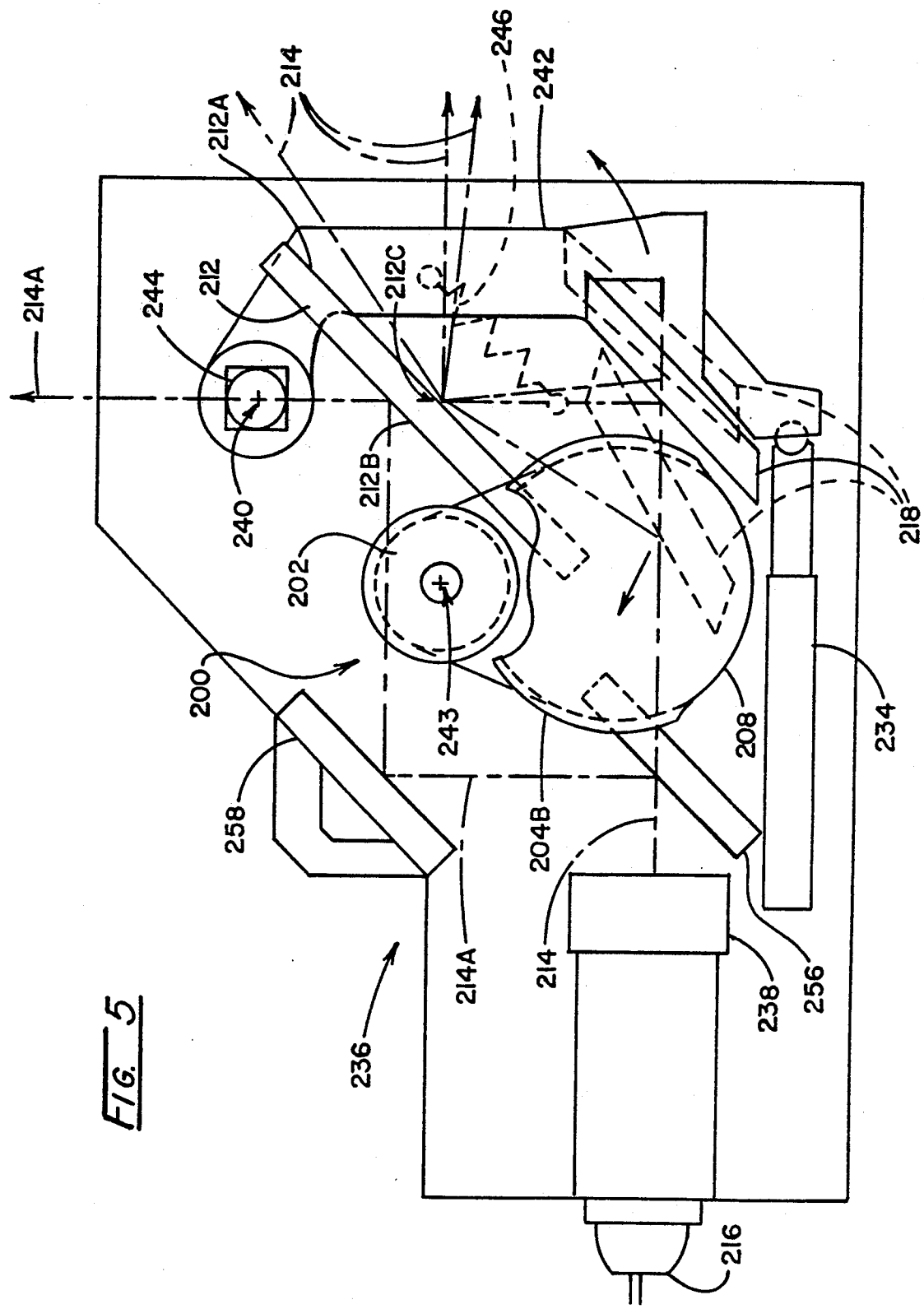

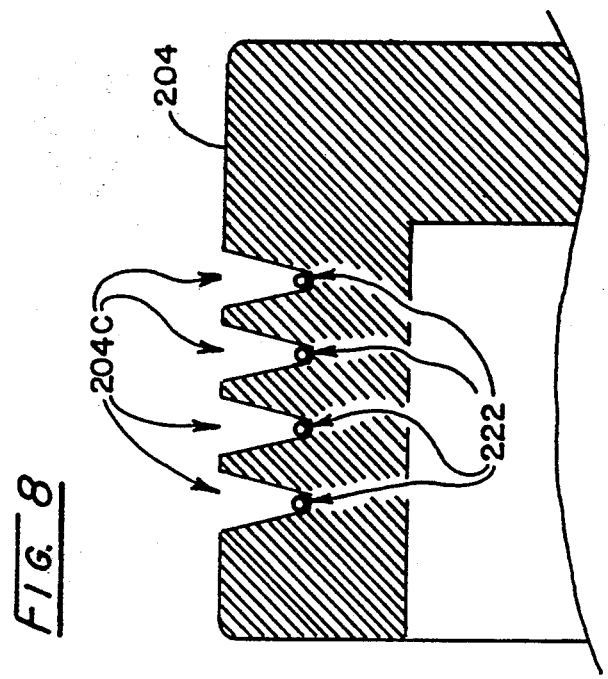
FIG. 7
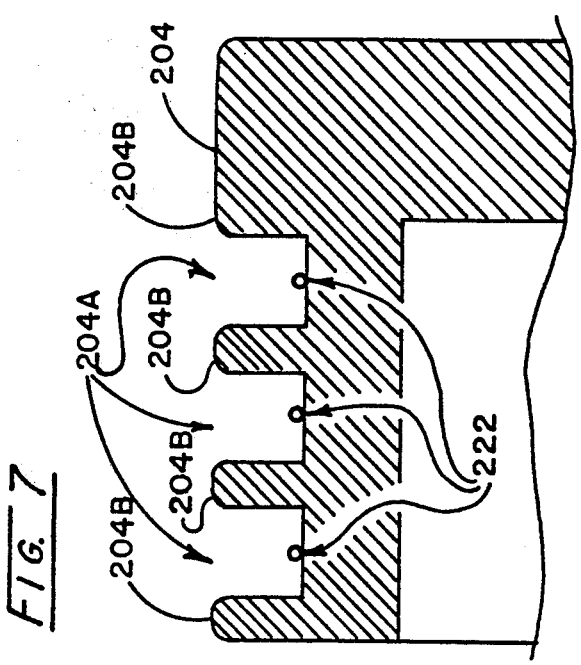
FIG. 9
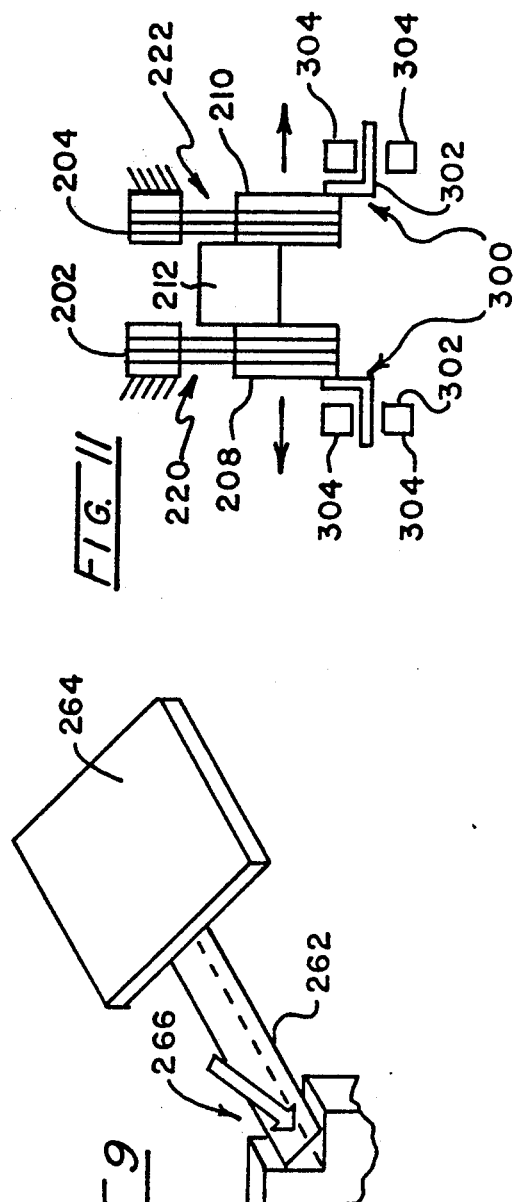
FIG. 8
FIG. 11

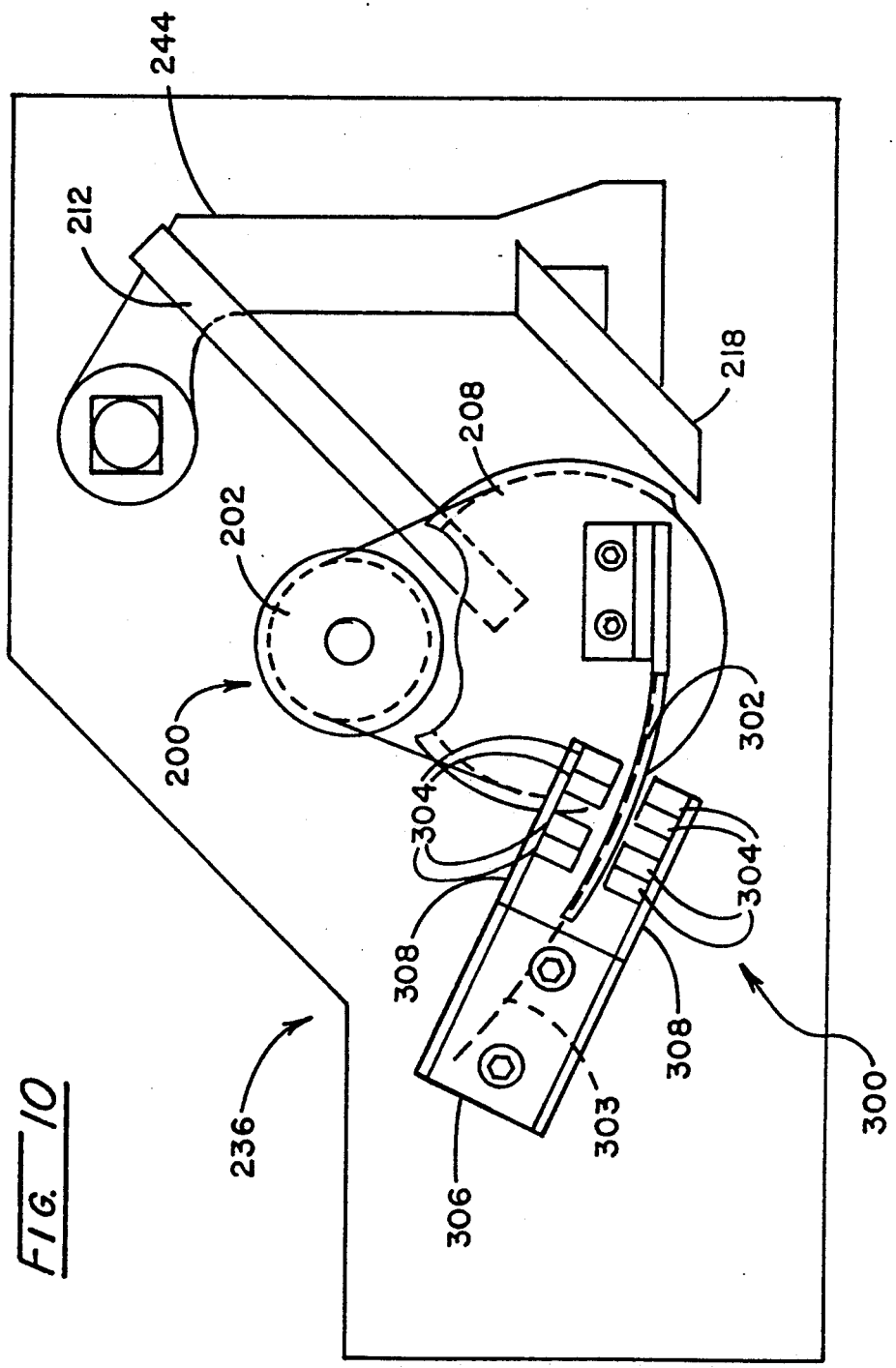

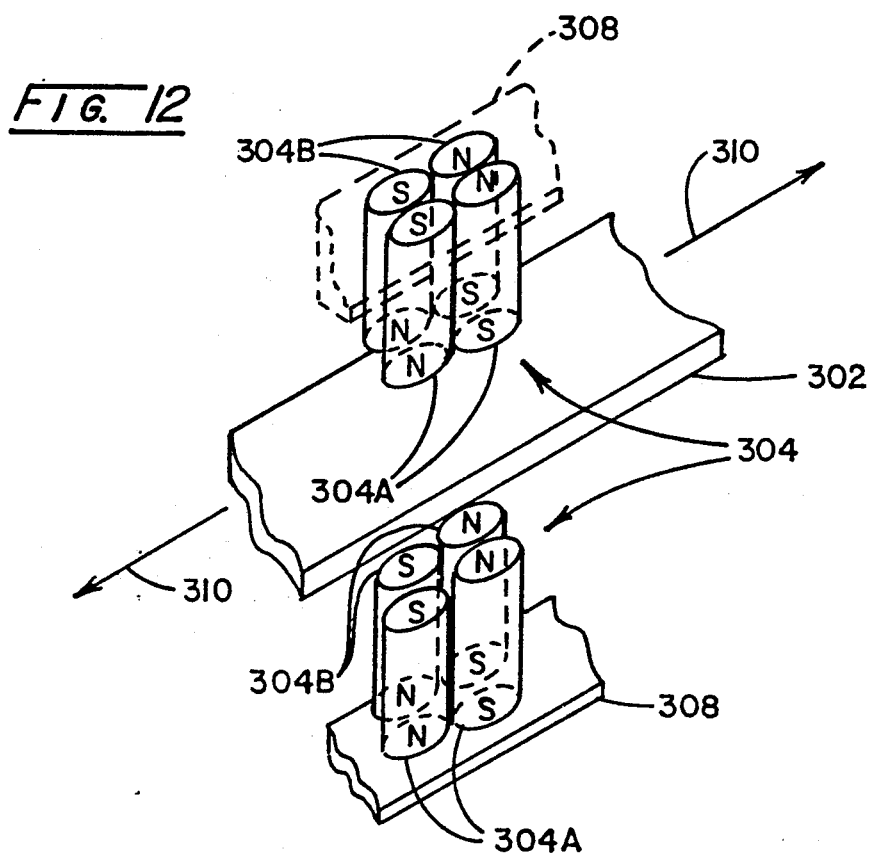
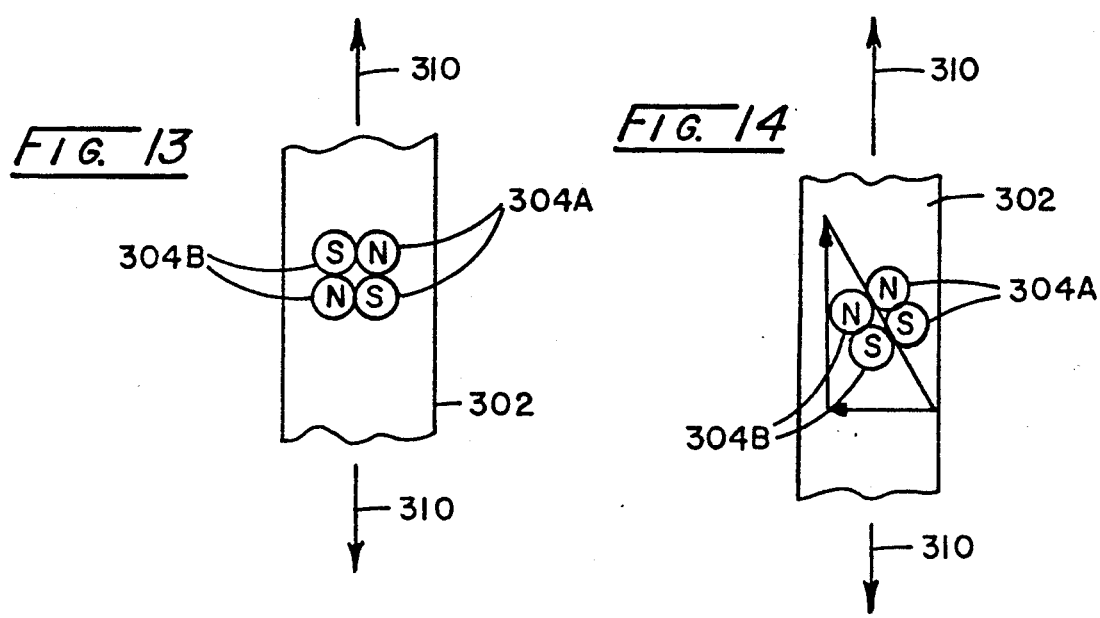

PENDULOUS COMPENSATOR FOR LIGHT BEAM PROJECTOR

CROSS REFERENCE TO RELATED APPLICATION

This application s related to an application entitled Pendulous Compensator Motion Damping System (SPC 030 PA) which was filed on even date herewith and is assigned to the same assignee as the present application.

BACKGROUND OF THE INVENTION

The present invention relates generally to light beam projectors and, more particularly, to a true pendulous compensator for use in such projectors wherein the compensator comprises a pulley system with a suspended pulley including a pendulum mirror secured to and movable with the suspended pulley for reflecting the light beam to compensate for tilting of the light beam projector.

Light beam, typically laser beam, systems are used in leveling, squaring and other alignment and control functions in the building and construction industries. When using light beam systems, it is important to be able to position a light beam source or projector such that the light emitted by the projector is maintained in a desired orientation for example horizontal or at a selected angle relative to horizontal. Since stable horizontal leveling of the projector may be difficult, particularly at a construction site, prior art light beam projectors have employed pendulous compensators to direct a vertically emanating light beam in a desired horizontal direction regardless of whether the projector is tilted and hence not absolutely horizontal.

A simplified schematic diagram of a laser beam projector 100 including a housing 102, a laser beam source 104, focusing lenses 106 and a conventional pendulous compensator 108 is shown in FIG. 1. The pendulous compensator 108 is shown as being mounted to a bracket 110 and comprising a pendulum arm 112 pivotally coupled to and suspended downwardly from the bracket 110 for pivotal movement within a plane perpendicular to a pivot axis 114 of the arm 112, and a beam reflecting mirror 116 fixedly attached to the lower end of the arm 112. The laser beam source 104 and the bracket 110 are fixedly attached to the housing 102 and aligned such that a laser beam 118 projected upwardly from the laser beam source 104 lies within the pivot plane of the arm 112 and preferably passes through the pivotal axis 114 of the pendulum arm 112 if the arm 112 and beam reflecting mirror 116 are removed.

When the projector 100 is placed in a true horizontal orientation, the laser beam 118 is emitted in a true vertical orientation and the pendulum arm 112, which in theory due to gravity always assumes a true vertical orientation, is aligned with the laser beam 118. The laser beam 118, which is first focused and collimated by the lenses 106, is reflected by the mirror 116 in the horizontal direction within the pivot plane of the pendulum arm 112. If the laser beam projector 100 becomes tilted away from horizontal, such tilting is compensated by the movement of the pendulum arm 112. However, if the pendulum arm 112 is freely movable about the axis 114, compensation errors result. Accordingly, a pair of counterbalancing springs 120 may be connected between the pendulum arm 112 and the housing 102 to correct the errors which would be created by true pendulous motion of the arm 112.

As seen in FIG. 2, the housing 102 and hence the laser beam 118 are oriented at an angle "a" relative to vertical. However, the pendulum arm 112 biased by the springs 120 is now displaced counterclockwise about the axis 114 from the line of emergence of the laser beam 118 through an angle "a/2" which compensates for the angular tilt of the housing 102. In accordance with known operating principles of the pendulous compensator 108, the laser beam 118 continues to be reflected by the mirror 116 substantially in the horizontal direction. As an alternative to the counterbalancing springs 120, the pendulum arm 112 can be cantilevered or fixedly mounted to the housing 102 with the arm 112 formed such that it bends or deflects to compensate for tilting movement of the projector 100.

Unfortunately, bearings for supporting the pivoting pendulous compensator 108 must not only precisely support the pendulum arm 112 but also permit the arm 112 to freely pivot under the forces of gravity and the springs 120. Such bearings tend to be either complex and thus expensive or inappropriately fragile such as knife-edge bearings and subject to damage in the rather harsh environment of a construction site. Further, friction within the bearings leads to errors in the corrected horizontal orientation of the laser beam 118 and creates hysteresis in the operation of the pendulous compensator 108. Selection and balancing of the springs 120 present additional problems particularly over extended time and when used in varying temperatures. Problems also are present in cantilevered pendulous compensators which tend to be nonlinear and are limited to correcting tilt angles of approximately 5° or less.

Accordingly, there is a need for a true pendulous compensator for a light beam projector which compensates for a wide range of tilt angles of the projector by maintaining the projected beam of light horizontal or at a desired angular orientation relative to horizontal in spite of such tilt angles, does not require complex, expensive bearings and can tolerate the harsh environment typical of construction sites.

SUMMARY OF THE INVENTION

This need is met by a pendulous compensator in accordance with the present invention which comprises a pulley assembly. A first pulley is secured to a light beam projector in a position to define a desired angular orientation relative to horizontal for the projected light beam. A second pulley supports a pendulum mirror and is in turn suspended from the first pulley by support means comprising filaments, tapes, loops or the like. The pendulum mirror receives a light beam from a light beam source and reflects the light beam in the desired angular orientation relative to horizontal. The pendulous/rotational motion of the second pulley and associated pendulum mirror under the interacting forces of gravity and the support means maintains the desired angular orientation of the projected beam by compensating for tilting of the light beam projector.

In accordance with one aspect of the present invention, a pendulous compensator for use in a light beam projector including a light beam source comprises first pulley means secured to the light beam projector for supporting the pendulous compensator. Pendulum mirror means are provided or receiving a light beam from the light beam source on one side thereof and reflecting the light beam from said one side in a desired angular orientation relative to horizontal. Second pulley means support the pendulum mirror means and are suspended beneath the first pulley means by support means extending between the second pulley means and the first pulley means such that the second pulley means and the pendulum mirror means are moved under the interacting forces of gravity and the support means to compensate for tilting of the light beam projector.

The pendulous compensator may further comprise grade selection means for selectively determining the angular orientation of the light beam relative to horizontal. The grade selection means may comprise mounting means for rotational movement of the first pulley means relative to the light beam projector and grade control means coupled to the first pulley means for rotating the first pulley means relative to the light beam projector to control their relative positioning to thereby select the angular orientation of the light beam relative to horizontal.

Alternately, the grade selection means may comprise folding mirror means defining a reflective surface and being pivotally mounted relative to the light beam projector for receiving the light beam from the light beam source and directing the light beam to the pendulum mirror means, and grade control means coupled to the folding mirror means for pivotally moving the folding mirror means to select the angular orientation. The folding mirror means may be mounted for pivotal movement relative to an axis substantially in the reflective surface of the folding mirror means, or an axis spaced from the reflective surface of the folding mirror means. In the later case, the pendulous compensator further comprises a pivot arm with the folding mirror means being mounted to one end of the pivot arm, the opposite end of which is mounted for pivotal movement relative to the light beam projector.

The grade selection means is formed to substantially eliminate beam offset errors from the light beam projector. This is accomplished by mounting the mirror means to produce an apparent source point for the light beam at the center of the first pulley means for the embodiment with the folding mirror means pivotal about an axis in its reflective surface. In the embodiment including the pivot arm, the pivotal movement of the arm directs the light beam to an apparent source point upon the pendulum mirror means which point is positioned a substantially constant distance relative to the center of the first pulley means.

The pendulous compensator may further comprise calibration means secured to the second pulley means for adjusting the center of gravity of the second pulley means to thereby calibrate the pendulous compensator. The calibration means may comprise at least one selectively positionable calibration member movable relative to the second pulley means to calibrate the pendulous compensator, the calibration member being secured in a selected position to maintain the pendulous compensator in calibration.

The support means may comprise at least one strand of boron monofilament extending at least once around the first pulley means and the second pulley means. The at least one strand of boron monofilament preferably is secured to the first and second pulley means. Alternately, the support means may comprise at least one length of titanium foil extending at least once around the first pulley means and the second pulley means The support means may also comprise at least one continuous support loop sized to fit around the first pulley means and the second pulley means.

The pendulous compensator may further comprise vertical reference beam generating means for projecting a reference beam in a substantially vertical orientation from the light beam projector. The vertical reference beam generating means may comprise optical means for directing a portion of the light beam to the side of the pendulum mirror means opposite to the one side and a reflective surface on the opposite side of the pendulum mirror means to reflect that portion of the light beam vertically from the light beam projector. The second pulley means and the pendulum mirror means also compensate for tilting of the light beam projector to maintain the portion of the light beam reflected from the opposite side of the pendulum mirror means substantially vertical. The ratio of the second pulley means to the first pulley means is substantially 2-to-1. The first pulley means may comprise at least one upper pulley having at least one surface or groove and the second pulley means may comprise at least one lower pulley having at least one surface or groove.

In accordance with another aspect of the present invention, a pendulous compensator for use in a light beam projector including a light beam source may comprise first and second upper pulleys spaced from one another and secured to the light beam projector. Each of the first and second pulleys define at least one groove by means of shoulders on either side of the groove. First and second lower pulleys are positioned beneath the first and second upper pulleys and each define at least one groove by means of shoulders on either side of the groove. Support means is provided for suspending the first and second lower pulleys from the first and second upper pulleys. Pendulum mirror means is secured to and supported between the first and second lower pulleys for receiving a light beam from the light beam source on one side thereof and reflecting the light beam from the one side in a desired angular orientation relative to horizontal. The first and second lower pulleys and the pendulum mirror means are supported such that the pendulum mirror means is moved to compensate for tilting of the light beam projector.

The support means may comprise a first boron monofilament strand for supporting the first lower pulley from the first upper pulley and a second boron monofilament strand for supporting the second lower pulley from the second upper pulley. The pulleys may each define three grooves with the first and second boron monofilament strands being looped three times around the first upper and lower pulleys and the second upper and lower pulleys, respectively.

The first and second boron monofilament strands preferably originate and terminate on lower sides of the first and second lower pulleys where both ends of the strands are secured to the first and second lower pulleys. The first and second boron monofilament strands may also be secured to upper sides of the first and second upper pulleys, respectively. The shoulders defining the grooves on the first and second lower pulleys are preferably removed from the lower sides of the first and second lower pulleys to facilitate cross-over of the strands from groove to groove across the pulleys. The ratios of the first and second lower pulleys to the first and second upper pulleys are substantially 2-to-1.

The pendulous compensator may further comprise grade selection means for selectively determining the angular orientation of the light beam relative to horizontal. The grade selection means may comprise folding mirror means pivotally mounted relative to the light beam projector for receiving the light beam from the light beam source and directing the light beam to the pendulum mirror means, and grade control means coupled to the folding mirror means for pivotally moving the folding mirror means to select the angular orientation of the light beam relative to horizontal. The folding mirror means may be mounted for pivotal movement relative to an axis substantially in the reflective plane of the folding mirror means. AlternatelY, the pendulous compensator may further comprise a pivot arm and the folding mirror means is then mounted to one end of the pivot arm, the opposite end of which is mounted for pivotal movement relative to the light beam projector on an axis spaced from the folding mirror means.

The folding mirror means preferably comprises a substantially planar glass mirror and a glass prism secured thereto by means of a glass-to-glass bond whereby distortions in the planar glass mirror due to bonding dissimilar materials are substantially eliminated. The glass prism extends beyond the planar glass mirror and is clamped to the pivot arm whereby distortions in the planar glass mirror due to clamping also are substantially eliminated. The grooves may be formed as screw threads around the pulleys. If so formed, the grooves are preferably formed as right-hand screw threads on the first upper pulley and the first lower pulley, and as left-hand screw threads on the second upper pulley and the second lower pulley.

It is an object of the present invention to provide an improved pendulous compensator for a light beam projector which compensates for a wide range of tilt angles of the projector; to provide an improved pendulous compensator for a light beam projector which is rugged and does not require complex and hence expensive bearings by means of a pulley assembly, the lower pulley of which supports a pendulum mirror; to provide an improved pendulous compensator for a light beam projector which not only compensates for tilting of the projector but also provides for selection of the grade angle of the light beam which is projected; and, to provide an improved pendulous compensator for a light beam projector which compensates a light beam which is projected at a selected angular orientation relative to horizontal and a light beam which is projected vertically.

Other objects and advantages of the invention will be apparent from the following description, the accompanying drawings and the appended claims.

BRIEF DESCRIPTION OF THE DRAWINGS

FIG. 3 is a schematic perspective view of a pendulous compensator in accordance with the present invention;

FIG. 3A is a perspective view of a loop of material which may be used in the present invention;

FIG. 4 is a schematic side view of the pendulous compensator of FIG. 3 illustrating the compensating operation of the pendulous compensator which maintains the horizontal orientation of a projected beam in spite of substantial tilting of an associated light beam projector;

FIG. 5 is a schematic side view of a light beam projector incorporating the pendulous compensator of the present invention and including means for selecting the grade angle relative to horizontal of a light beam projected therefrom;

FIGS. 7 and 8 show groove formations on pulleys which may be used in the present invention;

FIG. 9 is a perspective view of a mirror mounting arrangement advantageous for the present invention;

FIG. 10 is a schematic side view of a light beam projector incorporating the pendulous compensator of the present invention and including an eddy current damping system for the pendulous compensator;

FIG. 11 is a schematic end view of the pendulous compensator of the present invention illustrating a two plate eddy current damping system for the pendulous compensator;

FIG. 12 is a fragmentary perspective view of a portion of the eddy current damping system of FIGS. 10 and 11 illustrating rare earth magnet orientations for the damping system; and FIGS. 13 and 14 are plan views of a portion of the eddy current damping system of FIGS. 10 and 11 illustrating alternate orientations of the rare earth magnets for the damping system.

DETAILED DESCRIPTION OF THE INVENTION

Figure 2:
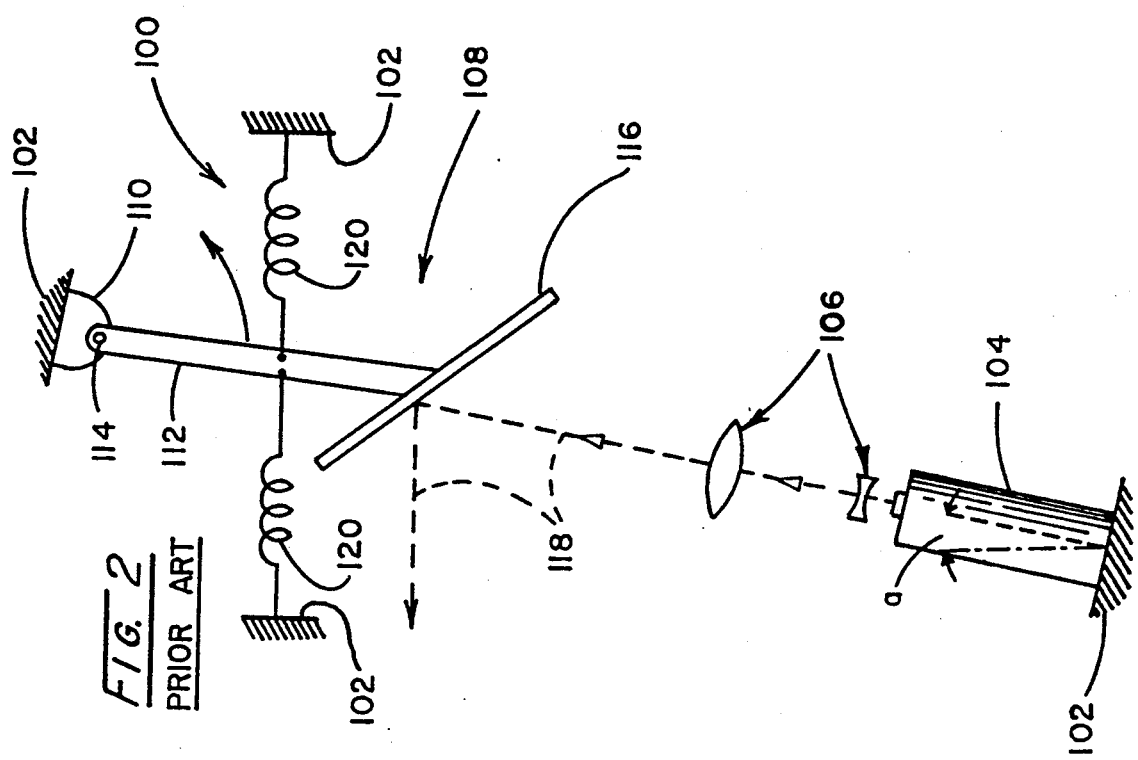
FIG. 1 and 2 are simplified schematic diagrams of a laser beam projector including a prior art pendulous compensator as previously described in the "Background of the Invention"
Figure 1:
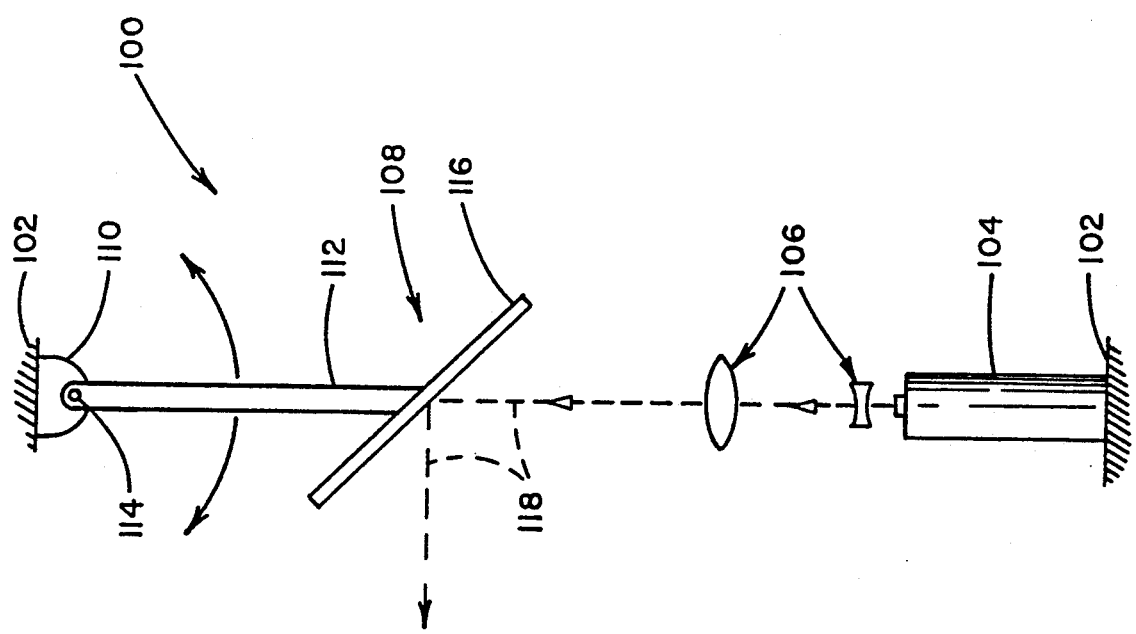

Reference is now made to FIG. 3 which illustrates in schematic perspective a pendulous compensator 200 in accordance with the present invention for use in a light beam projector to maintain a projected light beam in a desired horizontal direction or at a selected angular orientation relative to horizontal. As shown in FIG. 3, the pendulous compensator 200 includes first pulley means comprising first and second upper pulleys 202, 204 which are spaced from one another and secured to a housing 206 of an associated light beam projector. Second pulley means comprising first and second lower pulleys 208, 210 are positioned beneath the first and second upper pulleys 202, 204, respectively. Pendulum mirror means, comprising a pendulum mirror 212, is secured to and supported between the first and second lower pulleys 208, 210 for receiving a light beam 214 from a light beam source 216 on one side 212A of the pendulum mirror 212 and for reflecting the light beam 214 from the one side 212A in a desired angular orientation relative to horizontal. The ratio of the second pulley means to the first pulley means is substantially 2-to-1.

In FIG. 3, the light beam 214 is directed at a 0° orientation relative to horizontal, i.e. the light beam 214 is directed horizontally; however, the angular orientation or grade angle of the beam 214 also can be selected in the present invention as will be described. As shown in FIG. 3, the light beam 214 originates in a generally horizontal orientation and is reflected to the pendulum mirror 212 by a folding mirror 218, the light beam source could also be provided in other orientations with appropriate realignment of the folding mirror 218 or in a generally vertical orientation as shown by the dotted line source 216A with the folding mirror 218 being eliminated.

The first and second lower pulleys 208, 210 are suspended from the first and second upper pulleys 202, 204 by support means comprising filaments, tapes, loops or the like. As shown in FIG. 3, the support means comprise first and second boron monofilament strands 220, 222 which are looped three times around the first upper and lower pulleys 202, 208, and the second upper and lower pulleys 204, 210, respectively. To prevent interference with the operation of the pendulous compensator 200, the first and second boron monofilament strands 220, 222 preferably originate and terminate on the lower sides of the first and second lower pulleys 208, 210 where both ends of the strands are secured to the first and second lower pulleys 208, 210 by dabs 224 of an appropriate adhesive or otherwise. The boron monofilament strands 220, 222 may also be secured to the upper sides of the first and second upper pulleys 202, 204 again by dabs 224 of adhesive or other appropriate means.

Alternately, the lower pulleys 208, 210 can be suspended from the upper pulleys 202, 204 by tapes or continuous loops of material, for example loops of titanium foil as shown by a loop 226 in FIG. 3A. However, strands or filaments are preferred since tapes or bands require steep edge guides (not shown) or else they may wrap helically when the projector is subjected to a side tilt and result in errors. Strands or filaments also appear less vulnerable to side tilt perhaps due to a slight twist tolerance or a lower friction coefficient and also are much less likely to entrap grit at critical radius locations than tapes or bands. Strands or filaments also permit convenient multiple looping for strength without notable hysteresis and the use of a single winding strand or filament, which is secured to the pulleys, achieves and maintains substantially equal tension therein.

While a variety of materials such as titanium foil and fibers of carbon stainless steel, polyimide, tungsten, glass and boron compositions can be used to form the filaments, tapes, loops or the like for supporting the lower pulleys 208, 210 from the upper pulleys 202, 204, boron monofilament such as that commercially available from Avco Textron is the preferred material due to its strength and stability and the relative ease of manufacture when using boron monofilament strands. In a working embodiment of the present invention, the multiple (three) looped strands 220, 222 of four mil (0.004 inch) boron monofilament provided adequate strength to meet the shock requirements of construction field service and to satisfy stringent production drop testing of light beam projectors incorporating a pendulous compensator 200 of the present invention including the lower pulleys 208, 210, the pendulum mirror 212, and calibration means described hereinafter weighing in combination approximately one third (⅓) of a pound.

The pulleys each define at least one groove by means of shoulders on either side of the groove. The pulleys 202, 204, 208 and 210 each define three grooves 204A by means of shoulders 204B as shown in FIG. 7. The grooves 204A, combined with the springiness of the boron monofilament strands 220, 222, help maintain the strands 220, 222 in position on the pendulous compensator 200. Preferably, the grooves 204A are aligned between the upper pulleys 202, 204 and the lower pulleys 208, 210 such that no lead is required. For this construction, the shoulders 204B are removed in a noncritical area of the pulleys, e.g. a segment along the bottom of the lower pulleys 208, 210, to permit advancement with multiple loops of suspending material, see FIGS. 5, 6 and 10.

Alternately, the grooves in the pulleys 202, 204, 208, and 210 may be formed as screw threads 204C around the pulleys as shown in FIG. 8. If screw thread grooves are utilized in the pulleys, the screw threads should be the same for associated upper and lower pulleys, i.e. the pulleys 202, 208 should both have right-hand or left-hand screw threads and the pulleys 204, 210 should both have right-hand or left-hand screw threads. Such like screw thread formation facilitates passage of the strands around the grooves of the upper and lower pulleys.

If all grooves are formed as the same type screw thread, i.e. right-hand or left-hand, there may be a tendency for the lower pulleys 208, 210 to become "cocked". Accordingly, if screw thread grooves are used for the pulleys, preferably the grooves are formed as right-hand screw threads on the first upper pulley 202 and the first lower pulley 208, and the grooves are formed as left-hand screw threads on the second upper pulley 204 and the second lower pulley 210 or viceversa to balance the skewing forces.

Basic operation of the pendulous compensator 200 can best be understood by reference to FIG. 4 which schematically shows the orientation of the pendulous compensator 200 when the light beam projector housing 206 is horizontal (dashed line drawing) and when the light beam projector housing 206 has been tilted at an angle "A" of approximately 30° (solid line drawing). Due to the force of gravity and the free pendulous suspension of the support means, the lower pulleys 208, 210 will always be directly beneath the upper pulleys 202, 204. As shown by the dashed line drawing in FIG. 4, the light beam 214 is directed horizontally, i.e. parallel to the bottom of the light beam projector housing 206, when the housing 206 is horizontal. As the housing 206 is tilted, the upper pulleys 202, 204 are rotated by the same angular amount as the housing 206 since they are affixed thereto.

Since the ratio of the lower pulleys 208, 210 to the upper pulleys 202, 204 is substantially 2-to-1, the lower pulleys 208, 210 are rotated by one half the angular rotation of the housing 206. In addition, the lower pulleys 208, 210 are shifted such that they remain positioned beneath the upper pulleys 202, 204 As can be verified by known principles of geometry and optics and as illustrated by FIG. 4, such movement of the lower pulleys 208, 210 and the pendulum mirror 212 causes the laser beam 214 to continue to be reflected from the pendulum mirror 212 in the desired horizontal direction. It is noted that the pendulous compensator 200 of the present invention compensates for a wide range of tilt angles of a light beam projector incorporating the compensator, and does so without complex, expensive bearings. Further, the pendulous compensator 200 can stably tolerate the harsh environment typical of a construction site.

As previously noted, the ratio of the lower pulleys 208, 210 to the upper pulleys 202, 204 is substantially 2-to-1. While it is desireable for the sake of accuracy of the pendulous compensator 200 to precisely machine the pulleys 202, 204, 208, 210 to maintain the 2-to-1 ratio, it is possible to relax the precision of the machining of the pulleys 202, 204, 208, 210 and thereby their expense by incorporating calibration means into the pendulous compensator 200 for adjusting the center of gravity of the lower pulleys 208, 210 to thereby calibrate the pendulous compensator 200. In fact, in certain applications it may be desireable to slightly alter the 2-to-1 ratio and then utilize the calibration means for best accuracy of the compensator.

The calibration means preferably comprises at least one selectively positionable calibration member movable relative to the lower pulleys 208, 210 to calibrate the pendulous compensator 200. The calibration member may be secured in a selected position to maintain the pendulous compensator 200 in calibration. For example, the calibration means may comprise a first block 228 secured to the lower pulley 208 and a second block (not shown) secured to the lower pulley 210, see FIG. 3. Adjustment screws 230 are threadedly engaged with the blocks to effect calibration, with the screws 230 being secured to the blocks after adjustment to maintain calibration once attained.

An additional desireable feature of the present invention is the ability to incorporate grade selection means into the pendulous compensator 200. For example, the upper pulleys 202, 204 may be formed as a single unit or coupled together, as suggested by the dashed lines extending therebetween, and mounted for rotational movement relative to the light beam projector housing 206. The grade selection means may then comprise grade control means coupled to the upper pulleys 202, 204 for rotating the upper pulleys 202, 204 relative to the light beam projector housing 206 to select the angular orientation of the light beam 214 relative to horizontal. For example, the grade control means may comprise a lever arm 232 connected to the upper pulleys 202, 204 and a lead screw 234 operably connected to the lever arm 232.

Figure 6:
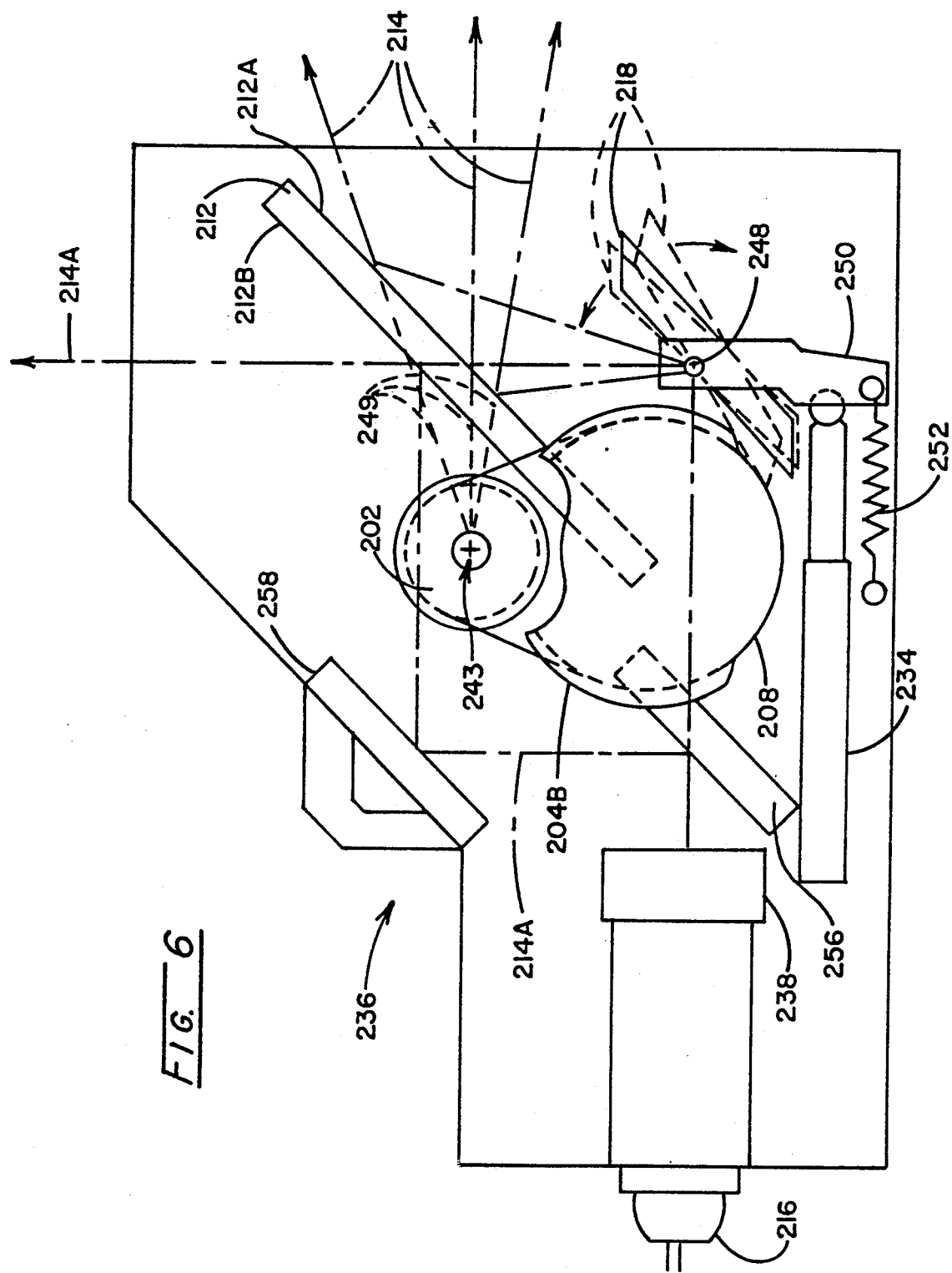
FIG. 6 is a schematic side view of a light beam projector incorporating the pendulous compensator of the present invention and including alternate grade selection means.

Reference is now made to FIGS. 5 and 6 which illustrate light beam projectors 236 incorporating the pendulous compensator 200 of the present invention and including alternate embodiments of grade selection means incorporated therein. It is noted that certain structural components have been omitted from various drawing figures for the sake of clarity and ease of description; however, corresponding structural elements are numbered the same throughout the drawing figures. As shown in FIG. 5, the light beam projector 236 comprises a laser diode light beam source 216 which emits laser light focused by a converging lens system 238 to form the laser or light beam 214. The light beam 214 is directed upon the folding mirror 218 which in turn reflects the light beam to the pendulum mirror 212 for projection from the light beam projector 236.

In the light beam projector 236 of FIG. 5, the folding mirror 218 is mounted for rotation about an axis 240 spaced from the folding mirror 218 and serving as the pivot point for a pivot arm 242 to which the folding mirror 218 is mounted. When the pivot arm 242 and hence the folding mirror 218 is positioned as shown in the solid line drawing, the light beam 214 is projected horizontally. If the pivot arm 242 is rotated clockwise to move the folding mirror 218 to the left of its solid line representation, the light beam 214 is directed upwardly at a positive angular orientation relative to horizontal. On the other hand, if the pivot arm 242 is rotated counterclockwise to move the folding mirror 218 to the right of its solid line representation, the light beam is directed downwardly at a negative angular orientation relative to horizontal. In accordance with known principles of geometry and optics, the angular orientation of the projected light beam 214 can thus be set by controlling the pivotal movement of the pivot arm 242 and the folding mirror 218 directs the light beam 214 to a given point on the pendulum mirror 212 as shown regardless of the projection angle selected. Further, the position of this point on the pendulum mirror 212 or the apparent source of the projected light beam 214, remains substantially constant relative to the axis 243 of the upper pulleys 202, 204 to avoid beam offset errors due to either grade or housing angular position.

The pivot arm 242 is biased into contact with a cylindrical support 244 centered upon the axis 240 and grade control means comprising the lead screw 234 by a spring 246. In this embodiment of the light beam projector 236, the angular direction of the projected light beam 214 is determined by the position of the pivot arm 242 which is in turn controlled by the lead screw 234; however, regardless of the angular direction selected, the pendulous compensator 200 maintains that direction as the light beam projector 200 is tilted.

As shown in FIG. 6, the light beam projector 236 comprises a laser diode light beam source 216 which emits laser light focused by a converging lens system 238 to form the laser or light beam 214. The light beam 214 is directed upon the folding mirror 218 which in turn reflects the light beam to the pendulum mirror 212 for projection from the light beam projector 236. In the light beam projector 236 of FIG. 6, the folding mirror 218 is mounted for rotation about an axis 248 substantially in the reflective plane of the folding mirror 218. When the folding mirror 218 is positioned as shown in the solid line drawing, the light beam 214 is projected horizontally.

If the folding mirror 218 is pivoted clockwise relative to its solid line representation, the light beam 214 is directed upwardly at a positive angular orientation relative to horizontal. On the other hand, if the folding mirror 218 is pivoted counterclockwise relative to its solid line representation, the light beam is directed downwardly at a negative angular orientation relative to horizontal. In accordance with known principles of geometry and optics, the angular orientation of the projected light beam 214 can thus be set by controlling the pivotal movement of the folding mirror 218 which directs the light beam 214 to a range of positions along the pendulum mirror 212 as shown. Accordingly, the pendulum mirror 212 of FIG. 6 may have to be longer than the pendulum mirror 212 of FIG. 5 depending upon the range of angular adjustment to be provided. Further, as indicated by the dashed lines 249 in FIG. 6, the geometry of the projector 236 is easily configured such that the apparent source of the projected light beam 214 is the axis 243 of the upper pulleys 202, 204 and substantially remains so to avoid beam offset errors regardless of the grade selected or housing angular position.

A pivot arm 250 is biased into contact with grade control means comprising the lead screw 234 by a spring 252. In this embodiment of the light beam projector 236, the angular direction of the projected light beam 214 is determined by the pivotal position of the folding mirror 218 which is in turn controlled by the lead screw 234; however, regardless of the angular direction selected, the pendulous compensator 200 maintains that direction as the light beam projector 200 is tilted.

The light beam projectors 236 of FIGS. 5 and 6 also include vertical reference beam generating means for projecting a reference beam in a substantially vertical orientation from the light beam projectors 236. In the illustrated embodiments of FIGS. 5 and 6, the vertical reference beam generating means comprises optical means for directing a portion 214A of the light beam 214 to the side 212B of the pendulum mirror opposite to the one side 212A and the pendulum mirror 212 includes a reflective surface on the opposite side 212B to reflect the portion 214A of the light beam 214 vertically from the light beam projectors 236. As should be apparent, the pendulum compensator 200 also compensates for tilting of the light beam projectors 236 to maintain the portion 214A of the light beam 214 substantially vertical.

The optical means may comprise a beam-splitter mirror 256 which reflects the portion 214A of the light beam 214 (approximately 10–20%) to a folding mirror 258 which in turn reflects the portion 214A of the light beam 214 to the opposite side 212B of the pendulum mirror 212 from which it is projected vertically from the light beam projectors 236. Of course, the portion 214A of the light beam 214 which is directed vertically can be any portion of the light beam 214 required by the application for the light beam projectors 236. Further, the folding mirror 258 can be relocated to offset the position of the vertical beam portion 214A as desired and utilized for vertical calibration.

The folding mirrors 218 and 258 preferably comprise substantially planar glass mirrors. Since distortion of the folding mirrors 218 and 258 may introduce intolerable errors in a light beam projector, the folding mirrors 218 and 258 are secured to glass prisms by means of a glass-to-glass bond such that distortions due to bonding dissimilar materials are substantially eliminated. As shown in FIG. 9, a glass prism 262 is thus bonded to and extends beyond a planar glass mirror 264 which may be one of the folding mirrors 218 or 258. The extension of the glass prism 262 beyond the planar glass mirror 264 provides a convenient clamping arm such that the combination of the mirror 264 and the prism 262 may be clamped by a Belleville clamp, compressed silicon or other appropriate arrangements into a light beam projector. By clamping the prism 262 at a point 266 spaced from the mirror 264, distortions in the mirror 264 due to clamping also are substantially eliminated.

The preferred embodiment of the pendulous compensator 200 includes apparatus 300 for damping its motion to rapidly stabilize the light beam 214 emanating from the projector, such as one of the light beam projectors 236 shown in FIGS. 5 and 6. For ease of illustration and description, such damping apparatus is shown in FIGS. 10 through 14 which exclude other portions of the associated light beam projectors which are not required for an understanding of the motion damping apparatus 300. The motion damping apparatus 300 comprises at least one motion damping plate 302 which is coupled to the pendulous compensator 200. While preferably formed of copper, the damping plate 302 may also be formed of silver, tin, zinc, lead, aluminum or other electrically conducting material. Although only one motion damping plate 302 is shown in FIG. 10, a motion damping plate 302 is secured to the outer sides of each of the first and second lower pulleys 208, 210, see FIG. 11. The motion damping plates 302 are curvilinear and coupled to the pendulous compensator 200 to move in substantial conformity with a corresponding curvilinear plane 303 defined by movement of the pendulous compensator 200.

The damping apparatus further comprises magnetic means, taking the form of rare earth magnets 304 in the illustrated embodiment, and being positioned adjacent the motion damping plates 302 for generating a magnetic field through which the plates 302 pass upon movement of the pendulous compensator 200. Accordingly, motion of the pendulous compensator 200 is damped by the interaction of magnetic fields which are produced by the rare earth magnets 304 and by eddy currents generated in the plates 302 by movement within the magnetic fields produced by the rare earth magnets 304. The rare earth magnets 304 are mounted to one of the light beam projectors 236 by mounting plates 306 which define backing plates 308 formed of ferro-magnetic material to provide a low reluctance path portion for the magnetic fields generated by the rare earth magnets 304. The strengths of the magnets 304 and thickness of the plates 302 can be selected in view of the size of the compensator 200, necessary spacing between the magnets 304 across the plates 302 and material used to construct the plates 302 to provide critical damping or over damping for the compensator 200 as required.

By forming the motion damping plates 302 to be curvilinear, coupling the plates 302 to the pendulous compensator 200 to move in substantial conformity with a corresponding curvilinear plane defined by movement of the pendulous Compensator 200 and positioning the rare earth magnets 304 on opposite sides of the corresponding curvilinear plane, the damping plates 302 are closely spaced to the rare earth magnets 304 for efficient damping operation of the apparatus. Further, this arrangement substantially maintains the spacing without contact between the plates 302 and the rare earth magnets 304 throughout the operating range of the pendulous compensator 200.

The number and orientation of the rare earth magnets 304 can be selected to vary the magnitude and direction of the damping forces applied to the pendulous compensator 200. As shown in exploded perspective in FIG. 12, preferably at least one pair of rare earth magnets 304A are positioned on each side of the corresponding curvilinear plane and hence the associated damping plate 302. The pairs of rare earth magnets 304A are aligned in a direction of maximum movement of the pendulous compensator 200 as shown by the arrows 310, i.e. in the direction of swinging movement of the first and second lower pulleys 208, 210. Further, the pairs of rare earth magnets 304A are oppositely poled relative to one another and this opposite poling is both in the direction of maximum movement of the pendulous compensator 200 and also across the corresponding curvilinear plane or damping plate 302. Thus, a north N pole is adjacent a south S pole at any pole definition point along the direction of maximum movement and also across the damping plate 302. This provides maximum motion damping in the direction of maximum movement with substantially reduced motion damping perpendicular thereto.

In the preferred embodiment of the present invention, the magnetic means comprise two pairs of rare earth magnets 304A, 304B positioned on each side of the corresponding curvilinear plane and hence the associated damping plate 302. The two pairs of rare earth magnets 304A, 304B are oppositely poled in the direction of maximum movement of the pendulous compensator 200 and also across the damping plate 302, but not in the direction perpendicular to the direction of maximum movement. This arrangement again provides maximum damping in the direction of maximum movement of the pendulous compensator 200 with substantially reduced motion damping perpendicular thereto. If more damping is desired laterally across the damping plates 302, the two pairs of rare earth magnets 304A, 304B can also be oppositely poled in that direction as shown in plan view in FIG. 13. The two pairs of rare earth magnets 304A, 304B can also be oriented at an acute angle relative to the direction of maximum movement of the pendulous compensator 200 as shown in plan view in FIG. 14. In the arrangement shown in FIG. 14, a majority of the damping force is directed in the direction of maximum movement of the pendulous compensator 200 and the remainder of the damping force is directed perpendicular thereto.

In the field, a light beam projector incorporating the present invention is set up and leveled with side-to-side leveling being of primary concern. Leveling is performed by use of adjustment screws included on a support frame and a float bubble level, all in accordance with well known practices in the industry. After such leveling, side-to-side tilting of the light beam projector is typically within ±3° which is readily accommodated by the motion damping arrangement of the present invention as shown in FIG. 11. For a tilt of 3°, the first and second lower pulleys 208, 210 are shifted vertically only 0.00206 inches for a separation of 1.5 inches between the first and second upper pulleys 202, 204 and the first and second lower pulleys 208, 210. This limited movement allows close spacing between the motion damping plates 302 and the magnets 304 without concern over contact therebetween. For the light beam projectors 236 of FIGS. 5 and 6 which are equipped to project the vertical light beam portion 214A, more precise leveling particularly side-to-side leveling is contemplated. For such projectors, a gimbaled mounting, precision vials or other precision leveling arrangements could be provided.

Having thus described the pendulous compensator of the present invention in detail and by reference to preferred embodiments thereof, it will be apparent that modifications and variations are possible without departing from the scope of the invention defined in the appended claims.

What is claimed is:

1. A pendulous compensator for use in a light beam projector including a light beam source, said pendulous compensator comprising:
   first pulley means secured to said light beam projector;
   pendulum mirror means for receiving a light beam from said light beam source on one side thereof and reflecting said light beam from said one side in a desired angular orientation relative to horizontal;
   second pulley means for supporting said pendulum mirror means beneath said first pulley means;
   support means for suspending said second pulley means from said first pulley means such that said second pulley means and said pendulum mirror means are moved under the interacting forces of gravity and said support means to compensate for tilting of said light beam projector; and
   grade selection means for selectively determining said angular orientation of said light beam relative to horizontal, said grade selection means comprising mounting means for rotational movement of said first pulley means relative to said light beam projector and grade control means coupled to said first pulley means for rotating said first pulley means relative to said light beam projector to select said angular orientation.

2. A pendulous compensator for use in a light beam projector including a light beam source, said pendulous compensator comprising:
   first pulley means secured to said light beam projector;
   pendulum mirror means for receiving a light beam from said light beam source on one side thereof and reflecting said light beam from said one side in a desired angular orientation relative to horizontal;
   second pulley means for supporting said pendulum mirror means beneath said first pulley means;
   support means for suspending said second pulley means from said first pulley means such that said second pulley means and said pendulum mirror means are moved under the interacting forces of gravity and said support means to compensate for tilting of said light beam projector; and
   grade selection means comprising folding mirror means defining a reflective surface, being pivotally mounted relative to said light beam projector for receiving said light beam from said light beam source and directing said light beam to said pendulum mirror means and being mounted to produce an apparent source point for said light beam at a center of said first pulley means to substantially eliminate beam offset errors from said light beam projector, and grade control means coupled to said folding mirror means for pivotally angular orientation of said light beam relative to horizontal.

3. A pendulous compensator for use in a light beam projector including a light beam source, said pendulous compensator comprising:
   first pulley means secured to said light beam projector;
   pendulum mirror means for receiving a light beam from said light beam source on one side thereof and reflecting said light beam from said one side in a desired angular orientation relative to horizontal;
   second pulley means for supporting said pendulum mirror means beneath said first pulley means;
   support means for suspending said second pulley means from said first pulley means such that said second pulley means and said pendulum mirror means are moved under the interacting forces of gravity and said support means to compensate for tilting of said light beam projector;
   grade selection means comprising folding mirror means defining a reflective surface, being pivotally mounted relative to said light beam projector for receiving said light beam from said light beam source and directing said light beam to said pendulum mirror means and grade control means coupled to said folding mirror means for pivotally moving said folding mirror means for selectively determining said angular orientation of said light beam relative to horizontal; and
   a pivot arm, said folding mirror means being mounted to one end of said pivot arm the opposite end of which is mounted for pivotal movement relative to said light projector about an axis spaced from the reflective surface of said folding mirror means.

4. A pendulous compensator for use in a light beam projector as claimed in claim 3 wherein pivotal movement of said arm directs said light beam to an apparent source point upon said pendulum mirror means which apparent source point is positioned a substantially constant distance relative to a center of said first pulley means to substantially eliminate beam offset errors from said light beam projector.

5. A pendulous compensator for use in a light beam projector including a light beam source, said pendulous compensator comprising:
first pulley means secured to said light beam projector;
pendulum mirror means for receiving a light beam from said light beam source on one side thereof and reflecting said light beam from said one side in a desired angular orientation relative to horizontal;
second pulley means for supporting said pendulum mirror means beneath said first pulley means;
support means for suspending said second pulley means from said first pulley means such that said second pulley means and said pendulum mirror means are moved under the interacting forces of gravity and said support means to compensate for tilting of said light beam projector; and
calibration means secured to said second pulley means for adjusting the center of gravity of said second pulley means to thereby calibrate said pendulous compensator.

6. A pendulous compensator for use in a light beam projector as claimed in claim 5 wherein said calibration means comprises at least one selectively positionable calibration member movable relative to said second pulley means to calibrate said pendulous compensator, said calibration member being secured in a selected position to maintain said calibration compensator in calibration.

7. A pendulous compensator for use in a light beam projector including a light beam source, said pendulous compensator comprising:
first pulley means secured to said light beam projector;
pendulum mirror means for receiving a light beam from said light beam source on one side thereof and reflecting said light beam from said one side in a desired angular orientation relative to horizontal;
second pulley means for supporting said pendulum mirror means beneath said first pulley means; and
support means for suspending said second pulley means from said first pulley means such that said second pulley means and said pendulum mirror means are moved under the interacting forces of gravity and said support means to compensate for tilting of said light beam projector, said support means comprising at least one strand of boron monofilament extending at least once around said first pulley means and said second pulley means.

8. A pendulous compensator for use in a light beam projector as claimed in claim 7 wherein said at least one strand of boron monofilament is secured to said first and second pulley means.

9. A pendulous compensator for use in a light beam projector including a light beam source, said pendulous compensator comprising:
first pulley means secured to said light beam projector;
pendulum mirror means for receiving a light beam from said light beam source on one side thereof and reflecting said light beam from said one side in a desired angular orientation relative to horizontal;
second pulley means for supporting said pendulum mirror means beneath said first pulley means; and
support means for suspending said second pulley means from said first pulley means such that said second pulley means and said pendulum mirror means are moved under the interacting forces of gravity and said support means to compensate for tilting of said light beam projector, said support means comprising at least one length of titanium foil extending at least once around said first pulley means and said second pulley means.

10. A pendulous compensator for use in a light beam projector including a light beam source, said pendulous compensator comprising:
first pulley means secured to said light beam projector;
pendulum mirror means for receiving a light beam from said light beam source on one side thereof and reflecting said light beam from said one side in a desired angular orientation relative to horizontal;
second pulley means for supporting said pendulum mirror means beneath said first pulley means; and
support means for suspending said second pulley means from said first pulley means such that said second pulley means and said pendulum mirror means are moved under the interacting forces of gravity and said support means to compensate for tilting of said light beam projector, said support means comprising at least one continuous support loop sized to fit around said first pulley means and said second pulley means.

11. A pendulous compensator for use in a light beam projector including a light beam source, said pendulous compensator comprising:
first pulley means secured to said light beam projector;
pendulum mirror means for receiving a light beam from said light beam source on one side thereof and reflecting said light beam from said one side in a desired angular orientation relative to horizontal;
second pulley means for supporting said pendulum mirror means beneath said first pulley means;
support means for suspending said second pulley means from said first pulley means such that said second pulley means and said pendulum mirror means are moved under the interacting forces of gravity and said support means to compensate for tilting of said light beam projector; and
vertical reference beam generating means for projecting a reference beam in a substantially vertical orientation from said light beam projector.

12. A pendulous compensator for use in a light beam projector as claimed in claim 11 wherein said vertical reference beam generating means comprises:
optical means for directing a portion of said light beam to the side of said pendulum mirror means opposite to said one side; and
said pendulum mirror means includes a reflective surface of said opposite side to reflect said portion of said light beam vertically from said light beam projector, said second pulley means and said pendulum mirror means also compensating for tilting of said light beam projector to maintain said portion of said light beam substantially vertical.

13. A pendulous compensator for use in a light beam projector including a light beam source, said pendulous compensator comprising:
first pulley means secured to said light beam projector;
pendulum mirror means for receiving a light beam from said light beam source on one side thereof and reflecting said light beam from said one side in a desired angular orientation relative to horizontal;

second pulley means for supporting said pendulum mirror means beneath said first pulley means, the ratio of said second pulley means to said first pulley means being substantially 2-to1; and support means for suspending said second pulley means from said first pulley means such that said second pulley means and said pendulum mirror means are moved under the interacting forces of gravity and said support means to compensate for tilting of said light beam projector.

14. A pendulous compensator for use in a light beam projector as claimed in claim 13 wherein said first pulley means comprises at least one upper pulley and said second pulley means comprises at least one lower pulley.

15. A pendulous compensator for use in a light beam projector as claimed in claim 14 wherein said at least one upper pulley has at least one groove and said at least one lower pulley has at least one groove.

16. A pendulous compensator for use in a light beam projector including a light beam source, said pendulous compensator comprising:

first and second upper pulleys spaced from one another, secured to said light beam projector and each defining at least one groove by means of shoulders on either side thereof;

first and second lower pulleys positioned beneath said first and second upper pulleys and each defining at least one groove by means of shoulders on either side thereof;

support means for suspending said first and second lower pulleys from said first and second upper pulleys; and pendulum mirror means secured to and supported between said first and second lower pulleys for receiving a light beam from said light beam source on one side thereof and reflecting said light beam in a desired angular orientation relative to horizontal, said first and second lower pulleys and said pendulum mirror means being supported such that said pendulum mirror means is moved to compensate for tilting of said light beam projector.

17. A pendulous compensator for use in a light beam projector as claimed in claim 16 wherein said support means comprises a first boron monofilament strand for supporting said first lower pulley from said first upper pulley and a second boron monofilament strand for supporting said second lower pulley from said second upper pulley.

18. A pendulous compensator for use in a light beam projector as claimed in claim 17 wherein said pulleys each define three grooves and said first and second boron monofilament strands are looped three times around said first upper and lower pulleys, and said second upper and lower pulleys, respectively.

19. A pendulous compensator for use in a light beam projector as claimed in claim 18 wherein said first and second boron monofilament strands originate and terminate on lower sides of said first and second lower pulleys where both ends of said strands are secured to said first and second lower pulleys.

20. A pendulous compensator for use in a light beam projector as claimed in claim 19 wherein said boron monofilament strands are secured to upper sides of said first and second upper pulleys.

21. A pendulous compensator for use in a light beam projector as claimed in claim 20 wherein the shoulders defining said grooves on the lower sides of said first and second lower pulleys are removed to facilitate cross-over of said strands from groove to groove across said pulleys.

22. A pendulous compensator for use in a light beam projector as claimed in claim 21 wherein the ratios of said first and second lower pulleys to said first and second upper pulleys are substantially 2-to-1.

23. A pendulous compensator for use in a light beam projector as claimed in claim 16 further comprising grade selection means for selectively determining said angular orientation of said light beam relative to horizontal.

24. A pendulous compensator for use in a light beam projector as claimed in claim 23 wherein said grade selection means comprises folding mirror means defining a reflective surface and being pivotally mounted relative to said light beam projector for receiving said light beam from said light beam source and directing said light beam to said pendulum mirror means, and grade control means coupled to said folding mirror means for pivotally moving said folding mirror means to select said angular orientation.

25. A pendulous compensator for use in a light beam projector as claimed in claim 24 wherein said folding mirror means is mounted for pivotal movement relative to an axis substantially in the reflective surface of said folding mirror means.

26. A pendulous compensator for use in a light beam projector as claimed in claim 24 further comprising a pivot arm and wherein said folding mirror means is mounted to one end of said pivot arm the opposite end of which is mounted for pivotal movement relative to said light beam projector about an axis spaced from the reflective surface of said folding mirror means.

27. A pendulous compensator for use in a light beam projector as claimed in claim 26 wherein said folding mirror means comprises a substantially planar glass mirror and a glass prism secured thereto by means of a glass-to-glass bond whereby distortions in said planar glass mirror due to bonding dissimilar materials are substantially eliminated.

28. A pendulous compensator for use in a light beam projector as claimed in claim 27 wherein said glass prism extends beyond said planar glass mirror and is clamped to said pivot arm whereby distortions in said planar glass mirror due to clamping are substantially eliminated.

29. A pendulous compensator for use in a light beam projector as claimed in claim 18 wherein said grooves are formed as screw threads around said pulleys.

30. A pendulous compensator for use in a light beam projector as claimed in claim 29 wherein said grooves are formed as right-hand screw threads on said first upper pulley and said first lower pulley, and said grooves are formed as left-hand screw threads on said second upper pulley and said second lower pulley.

31. A pendulous compensator for use in a light beam projector as claimed in claim 16 further comprising calibration means secured to at least one of said first and second lower pulleys for adjusting the center of gravity of said first and second pulleys to thereby calibrate said pendulous compensator.

32. A pendulous compensator for use in a light beam projector as claimed in claim 31 wherein said calibration means comprises at least one selectively positionable calibration member movable relative to said at least one of said first and second pulleys to calibrate said pendulous compensator, said calibration member being secured in a selected position to maintain said pendulous compensator in calibration.

* * * * *

UNITED STATES PATENT AND TRADEMARK OFFICE
CERTIFICATE OF CORRECTION

PATENT NO. : 5,033,848
DATED : July 23, 1991
INVENTOR(S) : Edward E. Hart, Peter S. Winckler, Douglas B. Monnin It is certified that error appears in the above-identified patent and that said Letters Patent is hereby corrected as shown below:

Col. 14, line 26-27, Claim 2,
"means for pivotally angular orientation of said light beam relative to horizontal" should be --"means for pivotally moving said folding mirror means for selectively determining said angular orientation of said light beam relative to horizontal"--

Col. 15, line 28, Claim 6, "calibration compensator" should be -- pendulous compensator"--.

Col. 17, Line 4, Claim 13, "2-to 1" should be --"2-to-1"--.

Signed and Sealed this

Sixth Day of April, 1993

*Attest:*

STEPHEN G. KUNIN

*Attesting Officer*  *Acting Commissioner of Patents and Trademarks*